No. 693,583. Patented Feb. 18, 1902.
F. A. BROWNELL.
SHUTTER FOR PHOTOGRAPHIC CAMERAS.
(Application filed Oct. 24, 1900.)
(No Model.) 2 Sheets—Sheet 1.
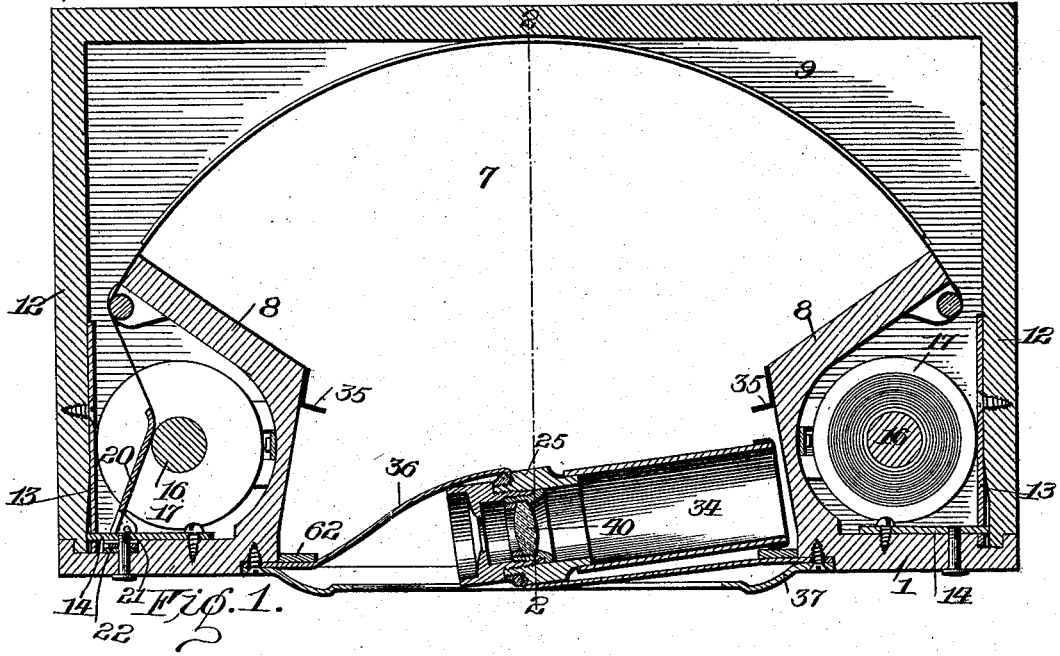
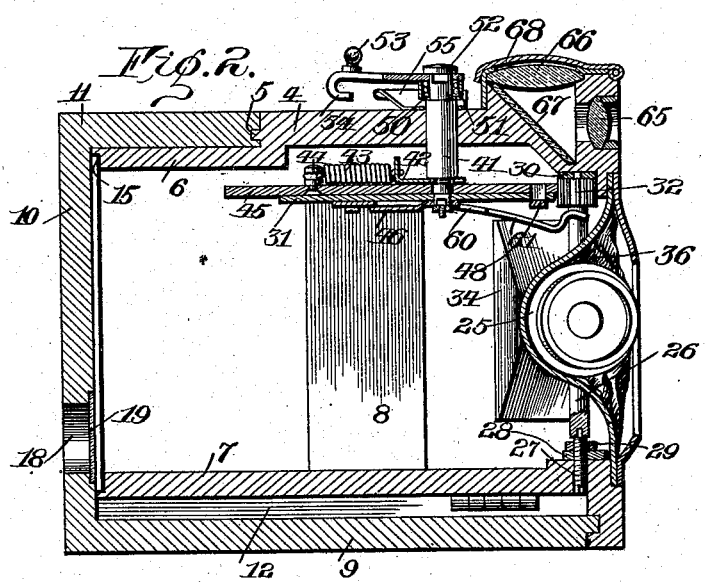
Witnesses.
Walter B. Payne.
F. Willard Rich.
Inventor.
Frank A. Brownell
by Underwood & Churm
his Attorney.

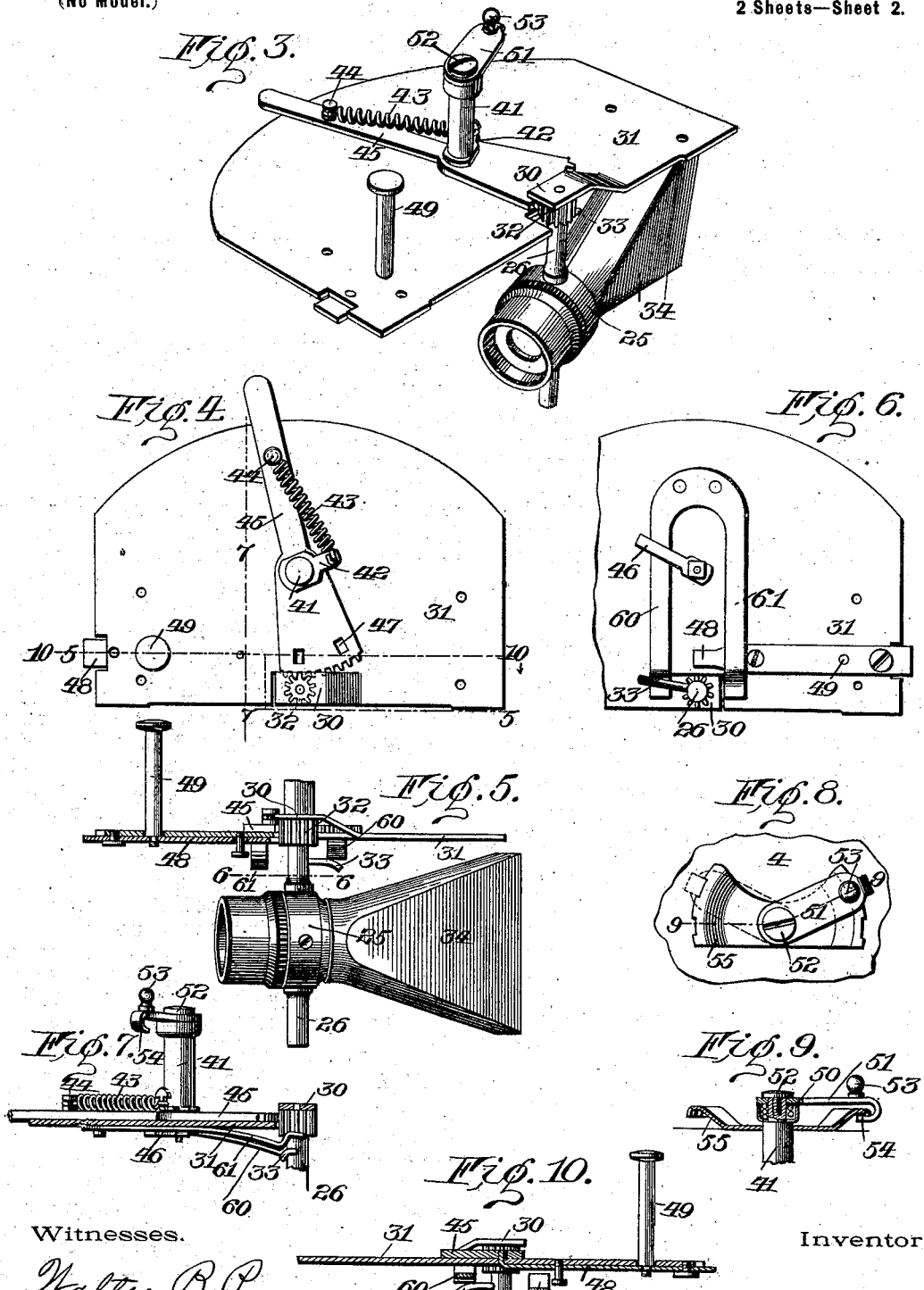

UNITED STATES PATENT OFFICE.

FRANK A. BROWNELL, OF ROCHESTER, NEW YORK, ASSIGNOR TO THE EASTMAN KODAK COMPANY, OF ROCHESTER, NEW YORK, A CORPORATION OF NEW YORK.

SHUTTER FOR PHOTOGRAPHIC CAMERAS.

SPECIFICATION forming part of Letters Patent No. 693,583, dated February 18, 1902.

Original application filed July 25, 1900, Serial No. 24,800. Divided and this application filed October 24, 1900. Serial No. 34,111. (No model.)

*To all whom it may concern:*

Be it known that I, FRANK A. BROWNELL, of Rochester, in the county of Monroe and State of New York, have invented certain new and useful Improvements in Shutters for Photographic Cameras; and I do hereby declare the following to be a full, clear, and exact description of the same, reference being had to the accompanying drawings, forming a part of this specification, and to the reference-numerals marked thereon.

My present invention has for its object to provide an improved shutter mechanism or lens-operating device adapted particularly for use upon panoramic cameras in which different portions of sensitized surface, such as film, are successively exposed to the action of the rays of light passing through the lens.

To these and other ends my invention consists in certain improvements and combination of parts, all as will be hereinafter fully described, and the novel features pointed out in the claims at the end of this specification.

This is a division of my former application, Serial No. 24,800, filed July 25, 1900.

In the drawings, Figure 1 is a horizontal sectional view of a panoramic camera provided with a shutter mechanism constructed in accordance with my invention. Fig. 2 is a vertical sectional view on the line 2 2 of Fig. 1. Fig. 3 is a perspective view of the shutter and its operating mechanism. Fig. 4 is a top plan view of the same. Fig. 5 is a sectional view on the line 5 5 of Fig. 4. Fig. 6 is a sectional view on the line 6 6 of Fig. 5 looking upward. Fig. 7 is a sectional view on the line 7 7 of Fig. 4. Fig. 8 is a plan view of the shutter-setting arm. Fig. 9 is a sectional view on the line 9 9 of Fig. 8. Fig. 10 is a sectional view on the line 10 10 of Fig. 4.

Similar reference-numerals in the various figures indicate similar parts.

In the present embodiment of my invention the camera consists of two separable parts, one containing the shutter and film holding devices and the other a casing serving to cover the film and the operating parts. The first-mentioned part embodies the front board 1, provided with the central aperture in which operates the lens and shutter mechanism, as will be described, and provided upon the rear side thereof near its ends and bottom edges with the grooves adapted to receive tongues formed upon the bottom and side portions of the casing. At the top of the front 1 is the rearwardly-extending top board 4, having upon its rear edge a tongue 5, adapted to engage a corresponding groove formed in the top of the removable casing, which portion of the latter is adapted to overlap an extension 6 of the top board 4, which forms a support for one side of the film, as will be described.

7 indicates the rearwardly-extending bottom board forming a support for the opposite side of the film, and between the top and bottom boards at the ends of the front are provided partitions 8, forming film chambers or pockets, which are open upon one side. The removable section or cover is adapted to inclose the rearwardly-projecting boards 6 and 7 and the film-pockets 8, and consists of the bottom 9, rear side 10, the top 11, and end portions 12, and the sides and bottom edges of the section are provided with the tongues engaging the grooves 2 and 3 upon the corresponding portions of the front 1, and in the top is arranged a groove adapted to receive the tongue 5 on the edge of the top 4, providing a light-tight joint between the meeting edges of the removable casing and the front board, preventing the entrance of light to fog or otherwise affect the sensitive film or paper. Suitable locking devices may be provided for securing the parts in position, embodying the latches 13, arranged upon the inner sides of the end portions of the casing and adapted to engage with the plates 14, attached upon the rear of the front board 1. The top and bottom boards 6 and 7, extending across the interior of the casing upon opposite ends of the film-chambers 8, are curved upon their rear edges, as shown, upon a radius described from the center upon which the oscillating lens is revolved, a slight groove or channel 15 being formed to guide and support the edges of the film in its curved path in rear of the lens.

16 indicates the film-spools, having the flanges 17 upon their extremities. The film or sensitive paper usually employed in cameras of this description, known as "daylight loading," is wound upon the spool, with an opaque covering or backing, and upon the exterior of the latter are provided a series of marks or designating-numerals indicating the number of the exposures and indicating also when a fresh strip of film has been wound into position after each exposure. In order to permit the operator to view these marks, I provide an aperture 18 in the rear side 10 of the removable casing, and over the inner end thereof I arrange a transparent ruby covering 19, of glass or similar material. In the present instance I have shown the full reel or spool containing the unexposed film located in the pocket upon the right-hand side of the camera, and in the opposite film-chamber upon the left-hand end of the camera-body is arranged the receiving spool or reel. In order to provide a slight tension upon the back of the black paper and insure said paper and the film winding evenly upon the reel or take-up spool, I provide a tension device embodying a plate 20, pivoted at 21 in lugs at the ends of the plate 22, secured in the front board 1.

When it is desired to load the camera, it is only necessary to disconnect the latches or locking devices 13 by means of any suitable operating device accessible from the exterior of the camera and withdraw rearwardly the casing-section, composed of boards 9 to 12, inclusive, thereby exposing the open-sided film-chambers, when a full spool of cartridge-film may be placed in the chamber to the right. The black paper of the cartridge is then moved around the rear of the film-support and its end is attached to the winding-spool arranged in the chamber to the left. The parts of the casing are then placed together and secured, as before. The tension-plate 20 is then moved forward so as to rest upon the black paper of the cartridge, as shown in Fig. 1, when the operator may wind forward the film until the indicating-mark upon the rear of the paper is visible through the aperture 18 in the casing. Then operate the exposing device or shutter, as will be presently described. Then wind forward the film and black paper for a new exposure. When all of the exposures have been made, the exposed cartridge may be removed by separating the parts of the casing, as before, and a new one inserted.

In a camera of this description it is desirable that the exposure be formed by the oscillation of the exposing-tube, preferably containing or inclosing a lens, said lens being mounted at the pivotal points of the tube, and as the rear end of the tube is moved across parallel with the curved film-support portions of the film from end to end will be successively exposed to the rays of light passing axially through the lens. In the present embodiment of my invention this shutter or exposing device embodies a collar 25, upon the opposite sides of which is a vertically-extending spindle or arbor 26, the lower end of said arbor being journaled upon an adjusting-screw 27, operating through a plate 28, secured mediately or immediately to the front board 1 of the casing. A lock-nut 29 is provided for holding said screw in adjusted position. The upper end of the spindle or arbor is journaled in a lug or ear 30 of a plate 31, secured mediately or immediately to the front board 1, and is provided with a pinion 32 and beneath this with a laterally-extending arm 33. Secured to the rear end of the collar 25 is a tube 34 or lens-holder flaring vertically toward the rear end and adapted, when the tube is on one side or the other of the center, to extend in close proximity to the inner sides of the partitions 8. Secured to partitions are flaps 35, of leather, cloth, or similar flexible material, for preventing the passage of light through the tube 34 to the film when said tube is moved to either side, but said flaps will permit the passage of the tube when making an exposure.

36 indicates a piece of flexible material, such as leather, secured to its outer edges beneath the front frame or plate 37 and having a central perforation through which extends the tube or collar 25, the portions of said flexible covering around said collar being secured by a collar 38, as shown in Fig. 1, so that while the collar and tube are permitted to oscillate on the arbor this flexible covering 36 will prevent the passage of light to film excepting through the oscillatory tube.

40 indicates the lens, secured within the collar 25 and having its vertical center in line with the vertical arbor or spindle 26. From this it will be seen that as the collar and tube 34 are oscillated across from side to side the film will be exposed, as described.

As a means for oscillating the tube or lens holder 34 and lens in opposite directions alternately I provide a reversible spring-actuated device capable of being set for oscillating the tube in opposite directions and of being released by the operation of a suitable catch, so that successive exposures may be made without capping the lens for the purpose of resetting the shutter. In the present arrangement this operating device is mounted upon the plate 30, in which is journaled an oscillatory setting arbor or shaft 41, having rigidly secured to it an arm 42, connected to a spring 43, the other end of said spring being connected to a pin 44 on a lever 45, pivoted loosely upon the arbor or shaft 41 and having at its forward end a segmental rack meshing with the pinion 32 on the upper end of the arbor carrying the tube 34. Secured rigidly to the lower end of the arbor 41 is an arm or finger 46, adapted to coöperate with spring-catches preferably formed of a single piece of spring material secured at the center to the plate 30, said spring-catches having shoulders at their forward ends adapted to engage, respectively, with the pin or arm 33 upon the arbor of the lens-tube. The forward end of the pivoted lever 45 is provided with two notches or recesses 47, with which is adapted to engage the bent end of a spring-catch 48, secured at its outer end to the plate 30 and operated upon by the lower end of a vertically-movable pin 49, extending to the exterior of the casing in position to be moved by the operator. The upper end of the arbor 41 is provided with the recessed portion, in which is arranged a small spiral spring 50, operating on the under side of the operating-handle 51, secured to the arbor by the screw 52, the outer end of said arm having an operating-knob 53 and the inwardly-extending projection 54, adapted to be engaged with a notched downwardly-extending flange formed upon the plate 55, mounted upon the top of the casing. Instead of employing the spring 50 it will be understood that the arm 51 could be made of spring material, so that the outer end would be raised into engagement with the notched plate by its own resiliency. The spring 50 operates to lift the outer end of the arm and to hold the projection engaged with the described notches, so that when the arm is moved around to either of the extreme positions shown in full and dotted lines in Fig. 8 the arbor 41 will be retained in this position, and as the arm 42, connected to the spring 43, is in the present arrangement directly beneath the operating-arm 51 the spring 43 will be placed under tension, and as the lever 45 is retained by the catch 48 the shutter can only be operated when said catch is released. In order to set the shutter for operation from, for instance, the position shown in full lines in Fig. 8, to which it was last moved, the operator grasping the operating-arm 51 disengages said arm from the serrated catch-plate and moves it across the center, engaging it with the notches upon the other side to the position in dotted lines in Fig. 8, this operation placing the spring 43 under tension, and the arm at the lower end of the arbor 41 lifts the retaining-latch 60 out of the path of the arm 46 and the arbor 41, the lever 51 being retained by the catch 54. In order to make an exposure, the operator presses upon the pin 49, disengaging the catch from the lever 45 and allowing the spring 43 to oscillate said lever on its pivot, turning the lens-tube in the opposite direction and causing the open rear end of the tube to move across the film. As the tube moves around the pin 33 on its arbor passes beneath the spring-latch 61, which is not engaged by the arm 46, and becomes engaged with the shoulder at the end thereof, preventing its rebounding and holding said tube. When it is desired to cause another operation of the exposing-tube, this time in the opposite direction, the operating-arm at the top of the arbor 41 is moved in the other direction and engaged with the notched plate, placing the spring under tension so as to throw the tube in the opposite direction and causing another exposure. Thus the exposing or lens tube is moved in opposite directions alternately and is effectually prevented from rebounding. The extreme movement of the exposing-tube is checked by suitable buffers 62, with which it contacts at the extremes of its movement.

The camera is further provided with a finder, arranged at the center of the upper portion and embodying lenses 65 and 66 and a mirror 67, a movable hood or shade embodying the pivoted top plate 68, arranged over the upper lens.

The device as a whole is simple, certain in operation, and by employing a reversible shutter mechanism the operator is not required to cap the lens when setting the shutter, and therefore is not liable to make a double exposure. It will be noted that the casing and front board carrying the operating parts are so arranged and constructed that when the casing is removed access may be readily had to the film-chambers and film-supports to apply or remove the spools of exposed and apply fresh film without the necessity of threading the paper or film through slits or passages.

I claim as my invention—

1. In a photographic shutter, the combination with an oscillatory apertured shutter member, of a pivoted lever connected thereto, a spring connected to the lever, a movable member connected to the opposite end of the spring and capable of a movement to opposite sides of the pivot of the lever, a catch for holding the parts with the spring under tension, spring-latches for automatically engaging and holding the shutter member from operation, and connections between the movable member and the latches for holding one of the latter out of operative position.

2. In a photographic shutter, the combination with an oscillatory shutter member, a reversible operating-spring for throwing the shutter in opposite directions alternately, and a catch for retaining the spring under tension and when tensioned to move the shutter member in either direction, of two automatically-engaging latches for retaining the shutter member after actuation by the motor, and means for moving one of the latches out of operative position when the operating-spring is tensioned to move the shutter member in either direction.

3. The combination with the oscillatory apertured shutter member, the pivoted lever connected thereto, the operating-spring connected to the lever, and the reversible arbor connected to the spring, of a catch for retaining the shutter member, latches for automatically engaging and holding the shutter member after being moved by the spring, and means on the arbor for holding one of the latches out of engaging position when said arbor is moved to tension the spring, and throw the shutter in either direction.

4. The combination with the arbor having the pinion and the tube thereon, the pivoted lever having the rack engaging the pinion, of the reversible setting-arbor, and means for securing it, the operating-spring connected to the setting-arbor and to the lever, the catch for engaging and holding the lever, latches adapted to automatically engage and hold the tube-arbor, and the arm on the setting-arbor for holding one of the latches out of operative position when the spring is placed under tension.

5. In an exposing device for panoramic cameras, a lens and its holder provided with a light-confining tube, means for swinging the lens-holder in opposite directions, and a locking device under the control of the lens-holder swinging means for temporarily locking the lens-holder at the limits of its swinging movement.

6. In an exposing device for panoramic cameras, a lens, and light-directing chamber pivotally mounted to swing together in opposite directions, means for swinging the lens and light-directing chamber to effect an exposure during the opposite swinging movements, and means for automatically locking the lens and light-directing chamber at both ends of each swinging movement.

7. The combination with the pivoted lens-tube having the lens therein, and the lever connected thereto, of the oscillatory arbor having the handle, catch devices for engaging and holding the handle, an arm on the arbor and a spring arranged between it and the tube-lever and means for holding the tube against the tension of the spring.

8. The combination with the pivoted lens-tube having the lens therein, and the lever connected thereto, of the oscillatory arbor, the yielding operating-handle thereon, the holding-plate engaged by the latter, the two arms on the arbor, the spring connecting one arm with the tube-lever, and latch mechanism for engaging and holding the lens-tube controlled by one arm on the arbor.

9. The combination of the pivoted lens-tube having the pinion thereon, the oscillatory arbor, the lever journaled loosely on the arbor having the rearwardly-extending portion and the gear-segment engaging the pinion, the arm secured rigidly to the arbor, the spring connecting said arm with the rear portion of the lever, latch mechanism for holding the lens-tube after actuation in either direction controlled by the movement of the arbor, means for holding the arbor, and a catch for holding and releasing the lens-tube.

10. The combination with the pivoted oscillatory lens-tube having the lens therein, of a reversible setting-arbor, a spring connection between it and the tube, the operating-handle on the arbor having the engaging lug, the spring between the handle and arbor, the plate having the notches with which the lug on the handle engages and means for holding and releasing the lens-tube.

11. The combination with the pivoted oscillatory lens-tube having the lens therein, of the reversible setting-arbor having the yielding setting-arm provided with the engaging lug, a spring connection between the arbor and tube, means for holding and releasing the lens-tube, and the plate arranged beneath the setting-arm having the notches in its under side with which the lug on the arm is adapted to be engaged.

FRANK A. BROWNELL.

Witnesses:
G. WILLARD RICH,
MAUDE A. BENTLEY.